Oct. 29, 1963  J. R. DUNCAN  3,108,499
METHOD AND APPARATUS FOR SEVERING SECTION
OF FLUID PIPELINE THEREFROM
Filed Sept. 28, 1960  3 Sheets-Sheet 1

INVENTOR
JOHN R. DUNCAN

BY Samuel L. Davidson
ATTORNEY

Oct. 29, 1963  J. R. DUNCAN  3,108,499
METHOD AND APPARATUS FOR SEVERING SECTION
OF FLUID PIPELINE THEREFROM
Filed Sept. 28, 1960  3 Sheets-Sheet 3

INVENTOR
JOHN R. DUNCAN

BY *Samuel L. Duncan*

ATTORNEY

United States Patent Office 3,108,499
Patented Oct. 29, 1963

3,108,499
METHOD AND APPARATUS FOR SEVERING SECTION OF FLUID PIPELINE THEREFROM
John R. Duncan, 400 Balboa St., Monroe, La.
Filed Sept. 28, 1960, Ser. No. 59,038
17 Claims. (Cl. 77—41)

This invention relates to a method of, and apparatus for, tapping fluid pipelines. More specifically, the invention is concerned with removing a section of a fluid pipeline and inserting a valve or other component therein without destroying line pressure and without losing any significant amount of fluid passing through the pipeline.

It should be understood at the outset that the term "fluid pipeline" as used herein refers to any type of pipeline to which apparatus components can be welded or attached, and through which liquids, gases, semi-liquids, or flowable materials pass.

In many instances, after a pipeline has been operatively connected with a supply, it becomes desirable to provide additional control valves in the line, or to "tap" the line so that branch mains can be coupled therewith.

One method of carrying out the necessary operation provides for closing-off the line at some point between the supply for fluid passing through the line and the location where it is desired to "tap" the line. By following such process, there is obviously no supply of fluid downstream of the location to be "tapped," and this is objectionable, as it not only is a source of fire risk in the event water is shut-off, but it produces considerable inconvenience to those located in districts from which the supply is, at least temporarily, shut-off.

In order to eliminate the disadvantages of the method discussed above, at least one worker in the art has heretofore suggested that the desired operations be carried out within a two-chamber housing. One chamber of the housing is adapted to enclose a portion of the pipeline from which a section is to be severed, and another chamber of the housing communicates with, and projects laterally of the first chamber. Means are provided for sealing-off the first chamber from the second chamber, and the second chamber is provided with a removable closure. The idea behind suggesting use of such a housing is that certain operations can initially be carried out with the first and second chambers in communication, and with the closure sealing the housing, and then subsequent other operations can be carried out with the first chamber sealed from the second, and the closure removed. More specifically, some means can be inserted in the housing for severing a section of the pipeline, and this means can be operated to achieve its desired function. After a section of the pipeline has been severed, then the severing means, as well as the severed section of the pipeline, can be moved from the first chamber of the housing into the second chamber of the housing, and communication between the first and second chambers can be shut-off so that the first section forms part of the pipeline. Thus, the closure for the second section can be removed and the severed section of pipeline, as well as means for severing such section can be removed from the housing. Some valve means can then be inserted in the second chamber, and the second chamber can be again closed. Once the housing is again closed, communication between the first and second chambers can be reestablished, and the valve which was placed in the second chamber can be moved therethrough and into the first chamber for operative engagement with the pipeline. By following this procedure it is possible to sever a section of a fluid pipeline, and insert a valve in the pipeline, all without disturbing line pressure, or interrupting the continuous flow of fluid through the pipeline.

Notwithstanding the fact that it is possible to achieve "pipeline tapping" without disturbing normal flow conditions by utilizing a "two-chamber" process as outlined above, the methods and apparatus heretofore suggested for carrying out such a process are somewhat inefficient, and are subject to inherent disadvantages. For example, with prior art apparatus of the type incorporating a tool assembly provided with a cutter carrying planetary gear drivably connected wtih a bevelled gear, the time required for installing the cutting mechanism initially can become substantial by virtue of the fact that exact gear adjustment must be made. Moreover, in such systems, a driving force is applied to only one side of the cutters, and thus if a cutter encounters a "hard-spot" in the pipeline, slippage and/or "gear-fouling" can result. While these particular troubles are given by way of illustration, it will be understood by those of ordinary skill in the art that other problems including cutter support difficulties, gear drive difficulties, installation difficulties, and the like are often encountered when prior art techniques are followed, and/or prior art apparatus is utilized.

The present invention is particularly concerned with improved operating methods, and improved apparatus which are particularly suited for tapping fluid pipelines without destroying normal flow conditions, and which provide for operation in, or incorporate respectively, a "two-chamber" housing.

A primary object of the present invention is to provide a method and apparatus of the type prescribed, which method and apparatus are not subject to the disadvantages of prior techniques and devices.

A further primary object of the present invention is to provide a method of severing a section of a pipeline by means of a cutting tool orbitally movable with respect to the pipeline, which method provides for trouble-free operation by using at least substantially equal forces acting on opposite sides of the tool means to cause movement thereof. Another primary object of this invention is to provide such a method which further includes the step of automatically repeatedly adjusting the cutting depth of the tool each time the tool completes an orbit around the pipeline.

Yet another, and still further primary object of the present invention is to provide an apparatus which can be operated in accordance with the method of the present invention. A specific primary object of the invention in this regard is to provide such an apparatus which incorporates hydraulically-operated means for moving the cutting tool.

Additional, still other, and further specific objects of the present invention are: (a) to provide a hydraulically-operated apparatus conforming with all of the preceding objects and incorporating a peripheral ratchet on a cutting tool assembly, and a pair of pawls engageable with the ratchet and linked with the hydraulic means whereby operation of the hydraulic means results in driving the cutting tool components in an orbital path about the periphery of the pipeline from which a section is to be severed; (b) to provide an apparatus as prescribed above which includes a housing having a first chamber adapted to be welded in enclosing relation with a pipeline and in surrounding relation with a tool means adapted to sever a section of pipe, a second chamber through which the tool means is movable, and means movable through said housing for sealing the first chamber from the second chamber when the tool means and a section of pipeline severed thereby are moved into the second chamber; (c) to provide an apparatus as prescribed in (b) above wherein a removable closure means is provided for the second chamber whereby when the first chamber is sealed from the second chamber, the closure means can be removed and the tool assembly and section of a pipeline severed thereby can be withdrawn from the housing; (d) to provide an apparatus conforming with any and all of the foregoing primary and specific objects of the present invention, which apparatus incorporates a two-chamber housing having guide means therein, a cutting tool means having guide means thereon cooperating with the guide means on the housing whereby the cutting tool means is directed in movement through the housing, and a valve means which can be inserted in the housing and which has guide means thereon cooperating with the same guide means in the housing whereby the valve means is directed in its movement through the housing; and (e) to provide a method and apparatus conforming with all of the preceding objects, which method and apparatus provide for easy and rapid installation and trouble-free operation.

Although emphasis has been placed above on what are believed to be the more important features of the instant invention, and the overall method and apparatus embodiments thereof, it is to be understood that one of the important objects of the present invention is to provide improved forms of particular components, such as tool supports, tool guides, and valve gates which are particularly advantageous when used to carry out the methods of the invention in the overall apparatus provided by the present invention, but which may be advantageously used in other apparatus assemblies without departing from the scope and spirit of the present invention.

Particular advantages of the present invention, in addition to those suggested above, are (a) the fact that many of the same apparatus components can be utilized for severing a pipeline section, for inserting a valve in the pipeline, and/or for repairing a valve operatively coupled in the pipeline; and (b) the fact that an additional safety factor is provided since no fluid flowing through the pipeline is exposed to the atmosphere during operations, thus eliminating fire and/or explosion hazards.

Briefly, the method of severing a section of a pipeline in accordance with the present invention includes the steps of supporting a cutting tool adjacent the periphery of the pipeline for orbital movement therearound, and then moving the cutting tool by intermittently applying simultaneous equal forces to opposite sides of the tool. To carry out the method, the apparatus provided by the present invention includes the combination of at least one cutting tool, means for supporting the cutting tool for orbital movement about the pipeline, and hydraulically-powered means for moving the cutting tool in its orbital path.

The invention will be better understood, and objects other than those specifically set forth above will become apparent to those of ordinary skill in the art, when consideration is given to the following detailed description of the invention. The description refer to the preferred and illustrative embodiments presented in the annexed drawings wherein:

FIGURE 1 presents an apparatus constructed in accordance with the present invention as the apparatus would appear in cross-section along a plane passing centrally of the apparatus and perpendicularly of the pipeline from which a section is to be severed;

FIGURE 2 presents, partially in section, the apparatus shown in FIGURE 1 as the same would appear from the side of a pipeline;

FIGURE 3 is similar to FIGURE 2 but shows the tool assembly components, and certain parts of the housing, of the apparatus in side elevation, whereas

FIGURE 5 presents a side view, partially in section, of a pawl coupling arrangement provided by the invention.

*General Method*

Figure 1:
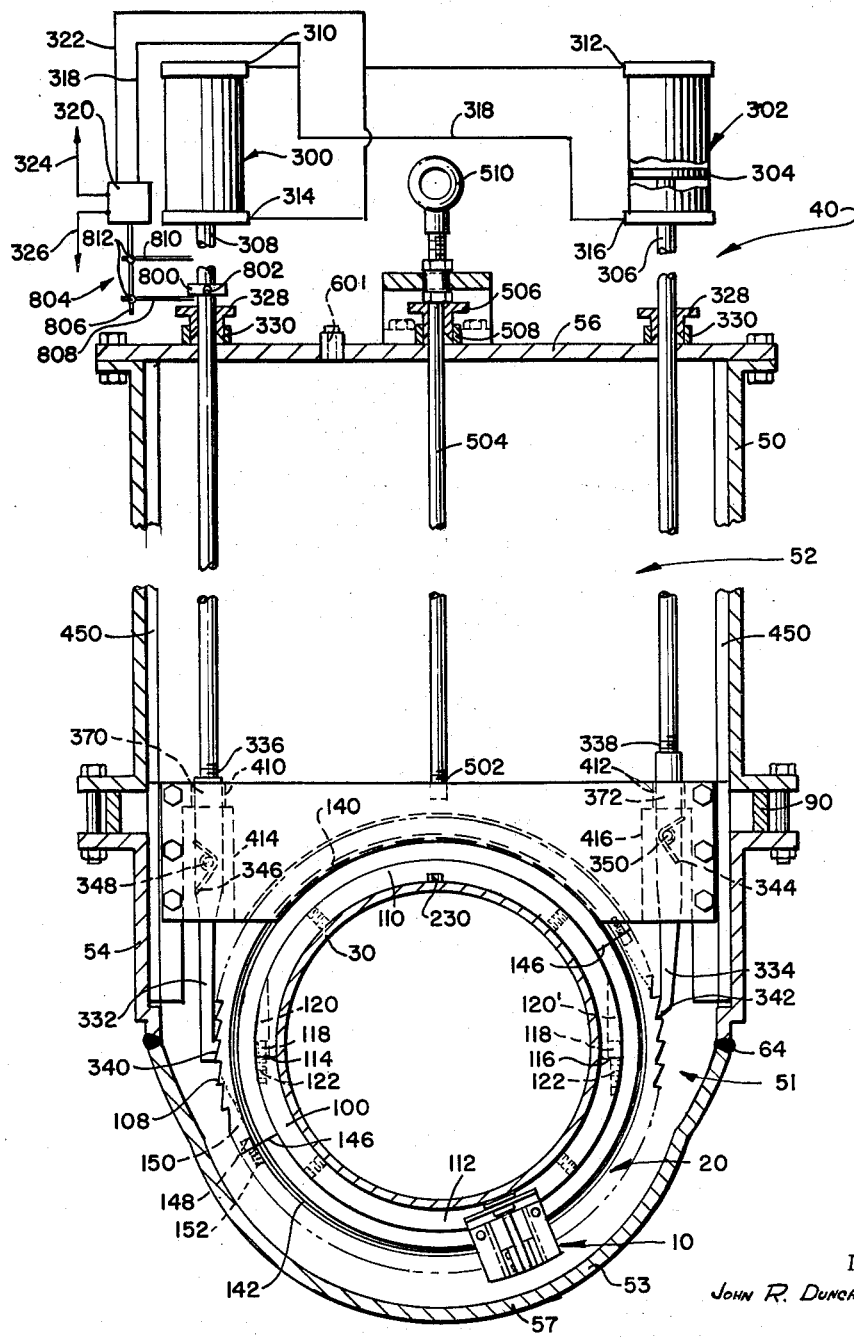

In accordance with the invention, a section of a cylindrical pipeline is severed while maintaining line pressure by (1) placing a peripherally movable cutting tool means in engagement with the pipeline; (2) providing a first chamber in sealing surrounding engagement with the pipeline and the cutting tool means; (3) providing a second chamber sealed with the first chamber and spaced from the pipeline; (4) moving the tool means about the periphery of the pipeline while repeatedly adjusting the cutting depth until a pipeline section is severed, the movement being caused by intermittently aplying at least substantially equal forces to opposite sides of the tool means to move the same about the periphery of the pipeline; (5) then moving the severed pipeline section and tool means from the first chamber to the second chamber; (6) then closing communication between the first and second chambers; and (7) thereafter opening the second chamber to remove the severed pipeline section and the tool means. The method further includes the step of inserting a valve means in the pipeline, if desired, after a section of the pipeline has been severed and removed from the chambers. Moreover, in accordance with the method of the invention, suitable means can be incorporated for coupling the pipeline with a branch main or the like.

As suggested above, a method of severing a section of a fluid pipeline while maintaining line pressure by utilizing a two-chamber or section housing has been previously disclosed. However, as also suggested the present invention represents an improvement on such method since it provides for moving the cutting tool by intermittently applying simultaneous equal forces to opposite sides of the tool.

The method is preferably carried out with a ring-supported cutting tool means; and the forces which act on the tool are preferably applied to the ring-support at circumferential points thereon spaced apart by at least substantially 180°. The preferred embodiment of the method of the invention additionally provides for automatically repeatedly adjusting the cutting depth of the tool or tools, as the case may be, with each revolution or orbit of the tool or tools about the pipeline.

*Apparatus for Severing a Section of a Fluid Pipeline*

The method of the present invention can be carried out in the apparatus provided by the invention and shown in the annexed drawings. Such apparatus, as shown in FIGURE 1, includes the combination of at least one cutting tool means 10, means generally designated by the numeral 20 for supporting the cutting tool 10 for orbital movement about the pipeline 30, and hydraulic means such as those generally designated by the numeral 40 for intermittently moving the cutting tool in its orbit.

Figure 2:
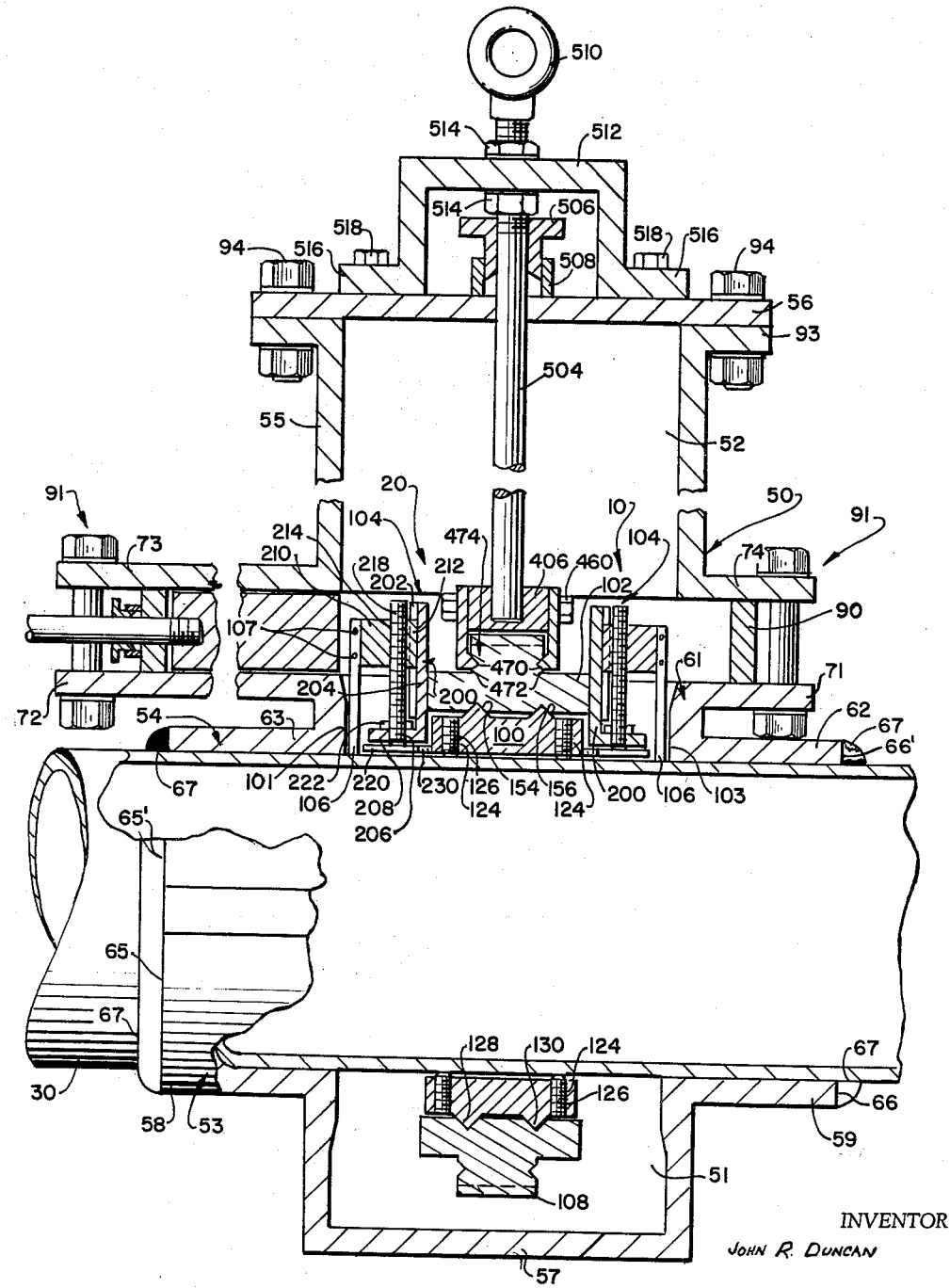
FIGURE 2 presents such components and parts in section.

The cutting tool means 10, and means for supporting the cutting tool means are shown in FIGURES 1 and 2 in the position which they assume when a section of the pipeline 30 is to be severed. When the cutting tool 10 and means 20 for supporting the cutting tool are so positioned, and before operation begins, a housing 50 is coupled to the pipeline.

The housing 50 includes a first chamber generally designated by the numeral 51 and a second chamber generally designated by the numeral 52. The first chamber 51 is adapted to enclose the pipeline 30 as well as the tool means 10 and the means 20 mounting the tool. The housing 50 is preferably formed from four components; namely, a bottom pipe engaging component 53, a top pipe engaging component 54, an elongated sleeve component 55, and a closure member 56. The bottom pipe engaging component 53, as best shown in FIGURE 2, comprises an enlarged central section 57 and side semi-cylindrical sections 58 and 59 extending laterally of the central section 57 and adapted to engage the pipeline. The top pipe engaging component 54 mates with component 53 and includes an enlarged central section which is generally designated by the numeral 61, and semi-cylindrical side sections 62 and 63 extending laterally of the central section 61 and adapted to engage the pipeline 30. As shown in FIGURES 1 and 2 the mating edges of central sections 53 and 54, the mating edges of the semi-cylindrical side sections 58 and 63, the mating edges of semi-cylindrical side sections 59 and 62 are welded together, and the end edges 65, 65', 66, 66' of the sections are welded to the pipeline as at 67.

The enlarged central sections 57 and 61 of the housing components 53 and 54 respectively are formed to provide shoulders 101 and 103 encircling the pipeline 30 and projecting laterally thereof. Such shoulders, as explained in more detail below serve as seats when a valve is inserted in the housing. The top pipe engaging section 54 is provided with flanges 71 and 72 projecting laterally outward of the shoulders 101 and 103, and such flanges are adapted to be coupled with cooperating laterally projecting flanges 73 and 74 carried at the base of the sleeve component 55. The flanges 73 and 74 are plate-like members which cooperate with a gate housing wall member 90. The wall member 90 extends between the flanges or plates 71, 72, 73, and 74, and bolts such as those designated by numeral 91 pass through aligned apertures in the respective flanges or plates to clamp gate wall member 90 in position therebetween.

For purposes of the explanation at this point, the gate wall member 90 can be considered merely as providing a seal between the flanges or plates in question. The operation and function of the gate wall, as well as the gate which cooperates therewith will be considered in more detail hereinbelow.

The sleeve component 55 when coupled with the top pipe engaging component 54 of the housing, as explained above, serves to define the chamber 52 which is contiguous with the first chamber and extends therebeyond laterally with respect to the pipeline 30. The closure 56 for the chamber 52 comprises a plate member having apertures therein adapted to be aligned with suitable apertures in a top flange 93 projecting laterally from the outside walls of the sleeve component 55. Suitable bolts 94 pass through the aligned apertures in flange 93 and closure plate 56 to couple the closure in position.

When the housing is assembled as described, then the same defines an enclosed area about the pipeline 30. If a section of the pipeline within the housing is severed therefrom, then fluid passing through the pipeline will merely fill up the housing 50 and then continue to flow through the housing. Thus, the housing serves to define an enclosure from which fluid flowing through the pipeline 30 cannot escape. Within this housing, as should be apparent, the section cutting operations are carried out by the cutting tool assembly.

*The Cutting Tool Assembly*

The cutting tool assembly comprises the cutting tool means 10 and the means 20 mounting the cutting tool means. The means 20 comprises a first split sleeve 100 adapted to be fixed on the pipeline, a second split sleeve 102 which serves as a rotatable tool support adapted to be mounted circumferentially of the first split sleeve 100, adjustable cutter supports 104 carried by the second split sleeve 102 and disposed to direct the cutting elements 106 thereof into engagement with the pipeline 30 on opposite sides of the first split sleeve 100, and a ratchet 108 disposed peripherally of the second split sleeve.

The first split sleeve 100 comprises two sections 110 and 112 which are jointed together at their ends along mating lines 114 and 116 by means of bolts 118 (shown in phantom in FIGURE 1). The bolts pass through recesses 120 and 120' in the section 110, and have threaded ends 122 that are received in threaded bores in the section 112 of sleeve 100. As shown in FIGURE 2, the sleeve 100 is also provided with radially extending threaded bores 124 adapted to receive set screws 126 which clamp the split sleeve 100 on the pipeline 30. Moreover, the first split sleeve 100 is provided with two circumferential spaced apart guide projections 128 and 130.

The second split sleeve or rotatable tool support 102 is also formed from two sections 140 and 142 (FIGURE 1) which are joined at their ends along mating lines 144 and 146 by means of bolts 148. The bolts 148, like the bolts 118 used to couple the first split sleeve sections, are disposed in suitable recesses 150 in the upper sleeve section 140, and are provided with threaded ends 152 which are received in suitable threaded bores in the lower section 142 of split sleeve 102. The recesses which receive the bolts coupling the separate sections of the split sleeves together extend along a cord of the sleeves, and comprise an enlarged bolt head receiving bore leading into a small bolt shaft receiving bore. By virtue of such construction, after the sleeves have been assembled, the sleeve coupling bolts are within the sleeve and thus do not interfere with operation.

The second split sleeve 102 includes a pair of guide recesses 154 and 156 spaced apart to receive the projecting guides 128 and 130 disposed circumferentially of the first split sleeve 100. In other words, the first split sleeve 100 is provided with a pair of male ways and the second split sleeve is provided with a pair of female ways which serve as cooperating guide means carried by the split sleeves for guiding orbital movement of the second split sleeve relative to the first split sleeve.

The second split sleeve 102 which as suggested, serves as a rotatable tool support, preferably carries on opposite sides thereof tool means 10 which are coupled to the second split sleeve by a weld, by bolts, or by any other suitable means.

*The Tool Means*

Each of the tool means 10 comprises a support, a cutter carrying block, and means for automatically moving the cutter carrying block with respect to the support upon each orbit of the cutter. Each of the cutter supports 104 comprises an L-shaped bracket 200 having a dovetail recess 202 in the inside face of the upstanding member 204 thereof. A bore 206 extends vertically through the base member 208 of each support. The bore 206 is disposed in spaced relation to the upstanding member 204 and the axis of the bore is parallel to the longitudinal axis of the recess 202.

The cutter carrying block, designated by numeral 210, is provided with a dovetail projection 212 on one end thereof, and the dovetail projection 212 fits within the dovetail recess 202 to slidably mount the block 210 on the L-shaped bracket 200 for reciprocal movement with respect to the base 208 of the bracket. The block member 210 has a threaded bore 214 therein, and when the block is in operative position, as shown, such bore is aligned with the bore 206 in the base member of the bracket 200. A shaft 218 extends through the bore in the base member and has threads thereon cooperating with the threaded bore 214 in the block 210. A pinion gear 220 is fixed on the end of the shaft 218 which extends through the bore 206 in the base member, whereby upon rotation of the pinion gear and thereby the shaft 218, the block member is moved relative to the base member. To insure proper operation, a lock nut 222 is fixed on the upper inside face of the base member 208 of the bracket 200.

The tool means 10 described above are fixed on the end of the second split sleeve 102 with the pinion gear 220 carried thereby extending laterally of and adjacent the side edge or end of the first split sleeve 100. The first split sleeve 100 is provided with a short rack gear 230 which extends in the path of the pinion gear 220. With such disposition of the rack gear 230 and the pinion gear 220, as the tool means 10 is moved in an orbital path about the periphery of the pipeline 30, the pinion gear 220 engages the rack gear 230, and as a result the pinion gear 220 rotates. Such rotation causes rotation of the shaft 218, and accordingly adjustment of the cutter carrying block 210. Although only one tool means, and thus one rack gear 230 and one pinion gear 220, have been described in detail, it should be understood that tool means 10 are identical except for being faced in opposite directions, that each includes a pinion gear, and that rack gears 230 are disposed on opposite sides of the first split sleeve for cooperation with the pinion gears of tool means disposed on opposite sides of the first split sleeve 100. The only difference in construction of the tool means on opposite sides of the split sleeves is that one will be threaded in one direction, and the other in the opposite direction for proper automatic adjustment of the cutters. The cutters 106 which are carried by the blocks 210 can be of any suitable well-known type, and can be fixed on the blocks 210 in any suitable manner such as by the screws 107 shown.

Having now described the tool means, as well as the means rotatably supporting the tool means, attention can be directed to the drive for the cutting tool assembly.

The Drive for the Cutting Tool Assembly

The split sleeve 102, second split sleeve, or rotatable tool support, has disposed about its periphery, as suggested above, a ratchet or continuous row of saw-tooth-type gear teeth. These gear teeth cooperate with a pair of pawls which are operated by, and form part of a hydraulic drive means. The hydraulic means has been generally designated by the numeral 40, and as shown in FIGURE 1, comprises a pair of cylinders 300 and 302, each of which have a piston such as that designated by numeral 304 carried therein. Coupled with each of the pistons is a piston rod, such rods being designated by the numerals 306 and 308. The cylinder 300 is provided with a fluid coupling 310 above the piston therein and the cylinder 302 is provided with a fluid coupling 312 above the piston therein. Moreover, each of the pistons is provided with a fluid coupling below the piston. More specifically, the cylinder 300 is provided with a fluid coupling 314 at the base thereof and the cylinder 304 is provided with a fluid coupling 316 at the base thereof. The top fluid coupling 310 of cylinder 300 and bottom fluid coupling 316 of cylinder 302 are coupled to a common fluid line which is shown schematically and designated by the numeral 318. The line 318 leads into a four-way valve 320 of conventional type. Another line 322 leads from the four-way valve 320, and is coupled with the bottom fluid coupling 314 of cylinder 300 as well as with the top fluid coupling 312 of cylinder 302. Fluid under pressure is fed to the valve 320 by means of a fluid inlet line schematically shown and designated by numeral 324. Fluid is drained from the system via a fluid outlet line 326.

By virtue of the coupling of lines 318 and 322 which leads from the four-way valve 320, when fluid under pressure is passed into the system via line 324 and such line is coupled with line 322 by valve 320, then pressurized fluid enters cylinder 300 below the piston therein, and cylinder 302 above the piston therein. At the same time, fluid is allowed to escape from cylinder 304 via the coupling 316 below the piston and from cylinder 300 via coupling 310 above the piston, and through line 318 which is coupled with drain line 326 by valve 320. Thus, when fluid under pressure is introduced in line 322, the piston rod 306 is moved, as shown, vertically upward, and the piston rod 308 is moved, as shown, vertically downward. The cylinders operate in a so-called "push-pull" relation.

The piston rods can be reciprocated by diverting fluid under pressure from line 322 to line 318 and then back to line 322, and by using the line which is not carrying fluid under pressure as an escape line. This is accomplished by operating valve 320 in a well-known manner.

Figure 5:
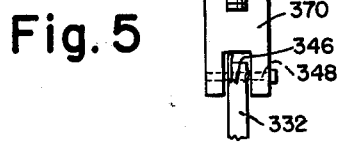
FIGURE 5 is also a fragmental detailed view; however

The piston rods 306 and 308, which are reciprocated by the action of the fluid on the pistons, pass through suitable packings 328 which cooperate with inlet couplings 330 in the closure member 56 disposed at the top of housing 50. The piston rods 306 and 308 extend downwardly through the chamber 52 of the housing 50, and are coupled at their lower ends with a pair of pawls 332 and 334. Preferably the pawls are provided with pawl couplings 370 and 372 which have threaded bores at their upper ends adapted to receive the threaded ends 336 and 338 of the piston rods 308 and 306 respectively. The pawl 332 is provided with a ratchet engaging projection 340 which is adapted to lock into a ratchet tooth when the pawl 332 is moved vertically upward as shown, and which is adapted to slip over the ratchet teeth when the pawl 332 is moved vertically downward as shown. The pawl 334, unlike pawl 332, is provided with a ratchet engaging projection 342 which is adapted to engage the ratchet teeth when the pawl 324 is moved vertically downward, as shown, but which is also adapted to slip over the ratchet teeth when the pawl 334 is moved vertically upward as shown. In order to allow for displacement for the pawls 332 and 334 so that they may slip over the ratchet teeth in one direction of movement, the pawls are yieldingly urged toward the ratchet teeth by means of springs 344 and 346 which surround the pawl pivot shafts 348 and 350, carried by the pawl couplings 370 and 372 and have extensions engaging an adjacent face of a pawl coupling. FIGURE 5 presents a fragmental detail end view of the pawl coupling 370 and elements cooperating therewith and it should be understood that the pawl coupling 372 and elements cooperating directly therewith have the same construction as shown in FIGURE 5.

Since the pawls 332 and 334 are coupled with the piston rods 308 and 306 respectively, when fluid under pressure is fed into the lines 322 and 318 alternatively, in the manner explained above, and the piston rods 308 and 306 are reciprocated, then the pawls 332 and 334 are reciprocated therewith. When the pawl 332 moves vertically upward as shown, the same engages the ratchet teeth 108 and causes vertical displacement of the rotatably mounted cutter support, or second split sleeve, 102. Similarly, as the piston rod 306 moves downward, the pawl 334 moves downwardly therewith and engages the ratchet teeth 108 causing rotation of the rotatable cutter support or second split sleeve 102. Obviously, by virtue of the fluid coupling between the cylinders, the pawls are operated simultaneously, and since the cylinders and pistons are the same size simultaneous forces of equal magnitude are applied on opposite sides of the rotatable cutter support, and thereby to the tool, in accordance with the method of the invention. Preferably, the pawls are disposed for equi-distant movement on opposite sides of a diameter of the pipeline, and thereby for equi-distant movement on diametrically opposed sides of the ratchet. More specifically, the forces are applied to the ratchet at points spaced apart by substantially 180°.

After the pawls have engaged the ratchet teeth to cause a given amount of rotation thereof, the valve 320 is operated and fluid under pressure is fed through the line 318; the line 322 being used for escape. As a result of this change in fluid line, the piston rod 308 is caused to move downwardly, and the pawl 332 coupled therewith slips over the ratchet teeth. Simultaneously, the piston rod 306 moves upwardly, and the pawl 334 carried thereby slips over the ratchet teeth. Once this operation has been completed, valve 320 is again operated and fluid under pressure is again directed through line 322 (line 318 serving as the escape line) and the piston rod 306 and pawl 334 move downwardly causing rotation of the rotatably mounted cutter support 102 while simultaneously the piston rod 308 and pawl 332 carried thereby move upwardly also causing rotation of the rotatably mounted cutter support. By virtue of the hydraulically operated pawl drive arrangement described, equal torques are applied to opposite sides of the rotatably mounted cutter support 102 and thereby to the orbitally movable cutter tool means 10 or specifically the cutters 106 thereof. If one of the cutters should encounter a "hard spot," forces are acting on the same simultaneously, one pulling, and one pushing, so that the cutter moves easily through the "hard spot."

As rotation of the cutters continues cycle after cycle, the cutters 106 are adjusted by the rack gears 230 which cooperate with the pinion gears 220, as explained in detail above, so that a deeper cut is made with each orbit of a cutter. Accordingly, eventually the pipe is severed at points spaced apart by the distance between the cutters, and the section can be removed.

In order to facilitate removal of the severed section as well as the tool assembly, and in order to properly support the components for the movements explained above, a tool assembly support frame is provided.

*Tool Assembly Support Frame*

Figure 4:
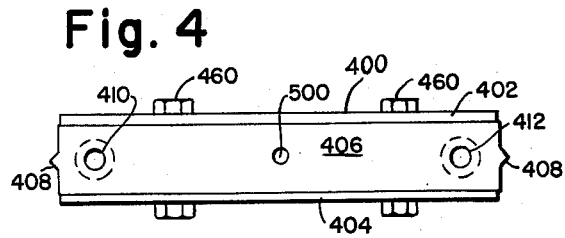
FIGURE 4 is a fragmental detailed top view of a tool assembly support frame provided in the preferred embodiments of apparatus constructed according to the invention.

The tool assembly support frame 400 (FIGURE 4) which is preferably used with the apparatus provided by the invention, comprises a sandwich structure including a pair of cutter support guide plates 402 and 404 disposed on either side of a guide spacer member 406. The spacer block 406 as shown in FIGURES 2 and 4 comprises an elongated rectangular member which carries at either end thereof a guide projection 408. The spacer block 406 is provided with bores 410 and 412 in the top thereof, and with aligned counter bores 414 and 416 respectively. The bores 410 and 412 are of a suitable size to slidably engage the pawl coupling members 370 and 372, and the counter bores 414 and 416 are of suitable size to permit pivotal movement of the pawls 332 and 334 about the pawl pivot shafts 348 and 350 respectively. The spacer block 406 when disposed within the housing has guide projections 408 on the ends thereof disposed in guide recesses 450 which are aligned and in opposite walls of the housing 50, as shown in FIGURE 1. The projections 408 on the spacer block and recesses 450 in the housing serve as cooperating guide means on the tool assembly frame support and housing for guiding movement of the tool assembly within the housing.

The plates 400 and 404 which are attached to opposite sides of the spacer block 406 by means of bolts 460 as shown, or by other suitable means if desired, serve as guide and support plates for the rotatably mounted split sleeve or cutter support ring 102. More specifically, as shown in FIGURE 2, each of the plates 400 and 406 is provided with an inwardly directed semi-circular guide projection 470. The inwardly directed arcuate guide projections 470 cooperate with recesses 472 in opposite faces of a projecting hub 474 which extends laterally from the periphery of the second split sleeve 102 and carries at its outer surface the ratchet teeth 108.

The guide projections 470 and cooperating recesses 472 coact with the guide projections 154 and 156 carried on the periphery of the first split sleeve, and the recesses on the second split sleeve cooperating therewith to properly support and guide the rotatably mounted cutter carrying sleeve 102.

The tool assembly frame thus serves to support and guide the rotatably mounted cutter support as well as to support and guide the pawls and piston rods. In addition, the tool assembly frame serves to guide movement of the tool assembly within the housing 50 laterally of the pipeline 30. More specifically, the spacer block 406 is provided with a central bore 500 which is threaded to receive the free end 502 of a coupling shaft 504 which extends through the closure 56 for the housing centrally thereof. The coupling rod 504 passes through a suitable sealing gasket 506 cooperating with an inlet coupling 508 and carries at its upper end a ring connection 510. The upper portion of the coupling rod 504 is threaded and passes through a block brace or bracket 512. Nuts 514 are provided on opposite sides of the top face of the bracket to lock the coupling rod 504 in firm engagement with the bracket.

Bracket 512 includes a pair of laterally projecting foot flanges 516 which are removably coupled to the closure 56 by means of bolts 518. When all of the parts are assembled, the bolts 518 secure the bracket 512 in place, and thereby lock the coupling rod 504 in the position shown in FIGURES 1 and 2. This maintains a downward force on the tool assembly support frame 400 and locks the same in operating position. When, however, it is desired to move the tool assembly upward, after a section of the pipeline has been severed, then the bolts 518 are removed and the coupling rod 504 is pulled vertically upward by a suitable means such as a block and tackle or crane coupled with the hook 510 on the top end of the coupling rod. If a section of the pipeline has been severed, then the section of the pipeline as well as the severing assembly and the tool assembly support frame move upwardly with the coupling rod 504.

The support for the cylinders 300 and 302 (not shown) can be moved upwardly with the coupling rod or if desired a suitable coupling can be provided in each of the piston rods whereby the lower part of the rod can be disconnected from the upper part, and the cylinders moved prior to moving the coupling rod 504 and thereby the tool means and tool assembly support upward within the housing.

By virtue of the facts (1) that the first split sleeve 100 is coupled to the pipe line originally; (2) that the second split sleeve surrounds the first one; (3) that the second split sleeve is coupled with the tool frame support by means of the guide projections 472, and (4) that the coupling rod 504 is attached to the tool assembly frame support, upward movement of the coupling rod 504 clears away all parts of the severing assembly, as well as the severed section and leaves the lower chamber 51 of the housing free of all operating components.

According to the invention, the tool assembly, tool frame support, and severed section are moved from the first chamber 51 to the second chamber 52, and then communication is closed off between the chambers.

For this purpose, there is provided within the housing a gate valve adapted to seal chamber 51 from chamber 52.

*Housing Gate Valve*

Figure 3:
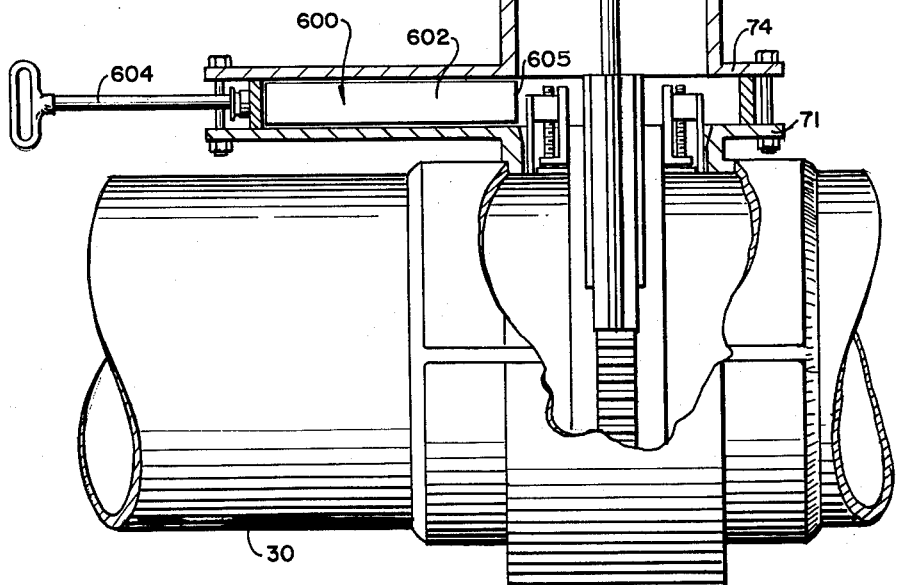
Figure 6:
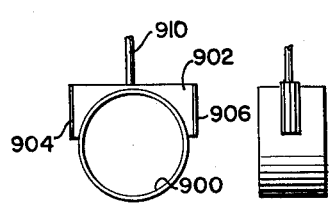
FIGURE 6 is a combined side and end view of an auxiliary device provided by the invention for use in the housing thereof when it is desired to clean a pipeline.

In discussing the housing 50 hereinabove, reference was made to a gate valve wall 90 which is coupled between flanges or plates 71, 72, 73 and 74 of the housing components 54 and 55. Such wall and the plates supporting the same define a gate housing extending around the housing 50 and having its major portion projecting from one side of housing 50. A gate valve 600 comprising a gate 602 and an operating handle 604 for the gate cooperates with the gate housing to provide a gate valve assembly. The gate 602 is movable through the housing 50 within the gate housing from the open position shown in FIGURE 3 to a position wherein the forward ends 605 of the gate 602 is between the flanges 71 and 74. The contour of the gate 602 conforms with the contour of the housing, but is slightly larger than the housing so that when the gate is moved to closed position it effectively seals the chamber 52 from the chamber 51. Of course, it will be understood that the gate 602 can only be moved to the closed position after the severed section of the pipeline, the tool assembly, and the tool assembly support frame have been moved out of the horizontal path of the gate 602 and into the chamber 52 of the housing.

While I have shown the preferred type of gate valve assembly used for sealing chamber 51 from chamber 52, it should be understood that any suitable gate valve of the various well-known types can be used.

After the tool assembly, severed pipeline section and associated devices have been moved into the chamber 52 of the housing, and the gate 602 has been closed, then a bleeder valve such as that schematically shown and designated by the numeral 601 can be opened to drain off some fluid within chamber 52 and remove excessive pressure within that chamber. After the pressure has decreased to atmospheric level, then the bolts 94 which couple the closure 56 with the sleeve component 55 of the housing can be removed, and thereupon the closure 56 can be lifted free to open the second chamber 52 of the housing. Then, the severed section of the pipeline, the tool assembly, and the tool assembly support frame, can be removed from within the housing. During this time, no fluid flowing through the pipeline enters the chamber 52, and thus no fluid is lost. Fluid traveling through the pipeline merely fills up the chamber 51 which is sealed off by the welded connections of the housing with the pipeline, as well as by the gate 602 which seals one chamber of the housing off from the other.

Once the above-described operations have been carried out, then, if desired, a suitable coupling can be attached to the sleeve member 55, and fluid can be directed into a branch pipeline. The gate valve 602 would automatically serve to open communication to such pipeline whereby the additional pipeline, would be in parallel with one part of the pipeline 30 leading into housing 50. Although this is a possible technique to be followed, usually it is desired to insert a valve within the severed section.

In accordance with the present invention, when it is desired to insert a valve in the pipeline from which a section has been severed, then such valve is placed in the chamber 52 while the closure 56 therefor is removed, and then the closure 56 is replaced, the gate 62 opened, and the valve lowered into position.

*Conclusion*

Although the components which are incorporated in the preferred apparatus provided by the invention, have been explained in great detail hereinabove, it should be understood that various modifications can be made thereto without departing from the scope and spirit of the invention. Moreover, it should be understood that various additional devices may be utilized with the assembly for specific purposes. For example, if desired, a coupling collar such as that shown in FIGURE 1 and designated by numeral 800 can be coupled on each of the piston rods by means of a set screw 802, and a suitable stop frame such as that designated by numeral 804 can be fixed to cooperate with the collar 800 to limit the amount of reciprocal movement of the piston rods.

Another device which can be used with the apparatus and according to the methods of the present invention, is shown in FIGURE 8. This device is particularly suited to be placed in the apparatus when it is desired to clean the line, for example, by "shooting pigs." The device comprises a cylinder 900, with the same inside diameter as the pipe line 30 and with a width equal to the space between the ends of the interruption in the pipeline from which a section has been severed. Attached to the cylinder 900 by any suitable means, such as by welding, is a cross-member or cylinder support 902. The cylinder support 902 is provided with guide projections 904 and 906 which are adapted to be received in the guide recesses 450 at opposite sides of the housing 50. A coupling rod 910 is fixed, preferably centrally, to the cross-member 902, and can be used like coupling rod 504 or shaft 730 to position the cylinder 900 between the ends of the pipeline within the housing.

The flanges or cooperating plate members of housing components 54 and 55 between which the gate housing wall 90 is disposed have been described hereinabove as comprising separate parts. More specifically, the flange 74 has been indicated as separate from the flange 73 and the flange 71 has been indicated as separate from the flange 72. It is to be understood that while the flanges or plate members may comprise separate parts, namely, one section adjacent the housing and another section projecting laterally of the first section, preferably the flange or plate which has been designated by the numeral 73 and the flange or plate which has been designated by the numeral 74 are integrally formed to provide a unitary laterally-projecting component which cooperates with another unitary laterally-projecting component formed of the flanges or plates which have been designated by the numerals 71 and 72.

Notwithstanding the fact that certain sealing gaskets have been presented in the apparatus shown in the drawings, it should be understood that such gaskets can take various forms and that additional gaskets can be provided by the mating components as desired, in accordance with usual practices. Moreover, even though bolt means have been shown for coupling many of the components together, other suitable coupling means can be used without departing from the scope and spirit of the invention.

After considering the foregoing detailed description of the illustrative and preferred embodiments of the invention, as well as auxiliary devices for use therewith, various modifications other than those specifically suggested may become apparent to those of ordinary skill in the art. Accordingly, what is claimed is:

1. In a method of severing a section of a cylindrical pipeline, the steps of encasing a portion of said pipeline in a fluid tight chamber, supporting a cutting tool adjacent the periphery of said portion of said pipeline for orbital movement therearound within said chamber, and then moving said cutting tool by intermittently applying a plurality of forces to said tool at spaced points about said pipeline and within said chamber to cause orbital movement of said tool.

2. In a method of severing a section of a cylindrical pipeline by utilizing a ring-supported cutting tool means movable about the periphery of said pipeline, and including the steps of encasing a portion of said pipeline in a fluid tight chamber repeatedly adjusting the cutting depth while moving the tool about the periphery of the pipeline and within said chamber until a section is severed, the improvement which comprises intermittently applying at least substantially equal forces to the ring at circumferential points thereon spaced apart by at least substantially 180° to move said tool means about the periphery of the pipeline.

3. In a method of severing a section of a cylindrical pipeline by encasing a portion of said pipeline in a fluid tight chamber and utilizing a cutting tool means movable about the periphery of said pipeline, and within said chamber and including the steps of intermittently hydraulically developing two transmittable simultaneous equal forces outside said chamber, and applying said forces to opposite sides of said tool means within said chamber to move said tool means about the periphery of said pipeline.

4. In a method of severing a section of a cylindrical pipeline by utilizing a peripherally movable cutting tool means while maintaining line pressure, and including the steps of providing a sealed chamber having a first section sealably surrounding said pipeline and a second section contiguous with said first section and spaced from said pipeline, placing the tool means in engagement with said pipeline within said first section of said chamber, then moving the tool means about the periphery of the pipeline while repeatedly adjusting the cutting depth until a pipeline section is severed, then moving the severed pipeline section and tool means in said chamber from said first section thereof to said second section thereof; then closing communication between said first and second sections of said chamber; and then opening said second section of said chamber to remove said severed pipeline section and said tool means; the improvement which comprises intermittently applying at least substantially equal forces to opposite sides of said tool means to move said tool means about the periphery of said pipeline.

5. In an apparatus for severing a section of a fluid pipeline therefrom while maintaining line pressure, the combination of a fluid tight housing means having a chamber therein for enclosing a portion of said pipeline at least one cutting tool, means for supporting said cutting tool for orbital movement about said pipeline and within said chamber, hydraulic means disposed outside said chamber, and means coupling said hydraulic means and said supporting means for moving said cutting tool by said hydraulic means.

6. In an apparatus for severing a section of a fluid pipeline therefrom while maintaining line pressure, the combination defined in claim 5 and further including means for automatically adjusting the cutting depth of said cutting tool upon each orbital of movement of said cutting tool.

7. Apparatus for severing a section of a fluid pipeline therefrom while maintaining line pressure comprising the combination of tool means including a rotatably-mounted tool support, and laterally-spaced cutters engageable with said pipeline and carried on said support; housing means having a first chamber adapted to enclose said pipeline and said tool means, and a second chamber through which said tool means is movable, said second chamber being contiguous with said first chamber and extending therebeyond, said housing having removable closure means for said second chamber; hydraulically-operated means for applying equal forces to opposite sides of said support to rotate said support and said cutters to sever a section of said pipeline; means for moving said tool means and a section of said pipeline severed thereby from said first chamber to said second chamber of said housing; and means movable through said housing for sealing said first chamber from said second chamber when said tool means and a section of said pipeline severed thereby are moved to said second chamber, whereby when said first chamber is sealed from said second chamber, said closure means can be removed and said tool means and a section of said pipeline severed thereby can be moved out of said housing while maintaining line pressure.

8. Apparatus for severing a section of a fluid pipeline therefrom while maintaining line pressure comprising the combination defined in claim 7, wherein said tool means comprises a first split sleeve adapted to be fixed on said pipeline, a second split sleeve forming said tool support and adapted to be rotatably mounted circumferentially of said first split sleeve, cooperating guide means carried by said split sleeves for preventing lateral movement of said second split sleeve relative to said first split sleeve; adjustable cutter supports carried by said second split sleeve and disposed to direct said cutters into engagement with said pipeline on opposite sides of said first split sleeve, and ratchet means carried by and encircling said second split sleeve; and wherein said hydraulically-operated means includes a pair of pawl arms simultaneously movable in opposite directions and disposed to cooperate with diametrically opposite portions of said ratchet means.

9. Apparatus for severing a section of a fluid pipeline therefrom while maintaining line pressure comprising the combination defined in claim 8, wherein said cooperating guide means comprises a pair of spaced circular recesses provided in the face of one of said sleeves adjacent the other sleeve, and a pair of spaced guide projections carried on the adjacent face of said other sleeve and disposed to extend into said recesses.

10. Apparatus for severing a section of a fluid pipeline therefrom while maintaining line pressure comprising the combination defined in claim 8 wherein said adjustable cutter supports each comprise an L-shaped bracket having a dove-tail recess in the inside face of the upstanding member thereof and a bore extending vertically through the base member thereof in spaced relation to said upstanding member, the axis of said bore being parallel to the longitudinal axis of said recess; a cutter-carrying block member having a dove-tail projection on one end thereof fitting within said recess to slidably mount said block member on said bracket for reciprocal movement with respect to the base of said bracket, said block member having a threaded bore therein aligned with said bore in said base member; a shaft extending through said bore in said base member and having threads thereon cooperating with said threaded bore in said block member; a pinion gear fixed on the end of said shaft extending through said bore in said base member whereby upon rotation of said pinion gear and thereby said shaft, said block member is moved relative to said base member; wherein said L-shape bracket of each of said cutter supports is fixed on an end of said second split sleeve whereby said gear carried thereby extends laterally of the adjacent end of said first split sleeve; and wherein said tool means further includes a pair of rack gears carried adjacent opposite ends of said first split sleeve and disposed to cooperate with the pinion gear of an adjustable cutter support fixed on an adjacent end of said second split sleeve to adjust the cutting depth of said cutter.

11. Apparatus for severing a section of a fluid pipeline therefrom while maintaining line pressure comprising tool means including a rotatably-mounted tool support, and laterally spaced cutters engageable with said pipeline and carried on said support; housing means having a first chamber adapted to enclose said pipeline and said tool means, and a second chamber through which said tool means is movable, said second chamber being contiguous with said first chamber and extending therebeyond, said housing having removable closure means for said second chamber; hydraulically-operated means including a pair of cylinders and a pair of pistons movable therein for applying equal forces to opposite sides of said support to rotate said support and said cutters to sever a section of said pipeline; means coupled with said tool means for moving said tool means and a section of said pipeline severed thereby from said first chamber to said second chamber of said housing; and means movable through said housing for sealing said first chamber from said second chamber when said tool means and the section of said pipeline severed thereby are moved to said second chamber, whereby when said first chamber is sealed from said second chamber, said closure means can be removed and said tool means and the section severed thereby can be moved out of said housing while maintaining line pressure.

12. Apparatus for severing a section of a fluid pipeline therefrom while maintaining line pressure comprising the combination defined in claim 11 wherein said hydraulically-operated means further includes valve means, and line means coupling said valve means with said cylinders whereby when fluid under pressure is fed to said valve means, said fluid is directed simultaneously above the piston in one cylinder and below the piston in the other cylinder.

13. Apparatus for severing a section of a fluid pipeline therefrom while maintaining line pressure as defined in claim 12 wherein each of said pistons includes an elongated piston rod adapted to extend within said housing, wherein said tool support includes a ratchet gear disposed peripherally thereof, and wherein a pawl is carried by each of said piston rods, the pawl on one of said piston rods being engageable with one side of said ratchet to move said ratchet when said pawl moves in one direction, and the pawl on the other of said piston rods being engageable with the other side of said ratchet to move said ratchet when said pawl on said other piston rod moves in a direction opposite said one direction.

14. Apparatus for severing a section of a fluid pipeline therefrom while maintaining line pressure as defined in claim 13 wherein said tool means further includes a frame support; wherein said frame support and said housing are provided with cooperating means for guiding movement of said tool means within said housing from said first chamber to said second chamber; and wherein said frame support includes means for guiding movement of said piston rods and said pawls when said pawls are disposed in engagement with said ratchet.

15. An adjustable cutter support comprising an L-shape bracket having a dove-tail recess in the inside face of the upstanding member thereof and a bore extending vertically through the base member thereof in spaced relation to said upstanding member, the axis of said bore being parallel to the longitudinal axis of said recess; a cutter-carrying block member having a dove-tail projection on one end thereof fitting within said recess to slidably mount said block member on said bracket for reciprocal movement with respect to the base of said bracket, said block member having a threaded bore therein aligned with said bore in said base member; a shaft extending through said bore in said base member and having threads thereon cooperating with said threaded bore in said block member; and a pinion gear fixed on the end of said shaft extending through said bore in said base member whereby upon rotation of said pinion gear and thereby said shaft, said block member is moved relative to said base member.

16. A tool assembly for severing a section of a fluid pipeline comprising a first split sleeve adapted to be fixed on said pipeline, a second split sleeve forming a tool support and adapted to be rotatably mounted circumferentially of said first split sleeve, cooperating guide means carried by said split sleeves for preventing lateral movement of said second split sleeve relative to said first split sleeve; adjustable cutter supports carried by said second split sleeve; and cutters carried on said supports and extending on opposite sides of said first split sleeve.

17. Apparatus for severing a section of a fluid pipeline therefrom while maintaining line pressure comprising the combination of tool means including a rotatably-mounted tool support, and laterally-spaced cutters engageable with said pipeline and carried on said support; housing means having a first chamber adapted to enclose said pipeline and said tool means, and a second chamber through which said tool means is movable, said second chamber being contiguous with said first chamber and extending therebeyond, said housing having removable closure means for said second chamber; means for applying equal forces to opposite sides of said support to rotate said support and said cutters to sever a section of said pipeline; means for moving said tool means and a section of said pipeline severed thereby from said first chamber to said second chamber of said housing; and means movable through said housing for sealing said first chamber from said second chamber when said tool means and a section of said pipeline severed thereby are moved to said second chamber, whereby when said first chamber is sealed from said second chamber, said closure means can be removed and said tool means and a section of said pipeline severed thereby can be moved out of said housing while maintaining line pressure.

References Cited in the file of this patent
UNITED STATES PATENTS

| | | |
|---|---|---|
| 587,091 | French | July 27, 1897 |
| 587,108 | Sherrerd | July 27, 1897 |
| 1,020,795 | Borden | Mar. 19, 1912 |
| 2,306,490 | Noble | Dec. 29, 1942 |
| 2,757,896 | Sangster | Aug. 7, 1956 |
| 2,851,773 | Jennison | Sept. 16, 1958 |